W. E. HALL.
NUT LOCK.
APPLICATION FILED SEPT. 23, 1908.

925,899.  Patented June 22, 1909.

Witnesses  
Addison N. Smith  
C. C. Hines

Inventor  
William E. Hall.  
By Victor J. Evans  
Attorney

UNITED STATES PATENT OFFICE.

WILLIAM E. HALL, OF HOPEDALE, OHIO.

NUT-LOCK.

No. 925,899.     Specification of Letters Patent.     Patented June 22, 1909.

Application filed September 23, 1908. Serial No. 454,481.

*To all whom it may concern:*

Be it known that I, WILLIAM E. HALL, a citizen of the United States, residing at Hopedale, in the county of Harrison and State of Ohio, have invented new and useful Improvements in Nut-Locks, of which the following is a specification.

This invention relates to nut locks of the spring washer type, the object in view being to provide a simple and inexpensive form of spring locking washer adapted to be clamped between the nut and object to be secured and having a novel construction and arrangement of locking tongues to hold the washer and nut from retrograde rotation, the said washer also being constructed to permit of the manual retraction of the nut engaging tongue for the removal of the nut from the bolt when occasion requires.

The invention consists of the features of construction, combination and arrangement of parts hereinafter fully described and claimed, reference being had to the accompanying drawing, in which:—

Figure 1:
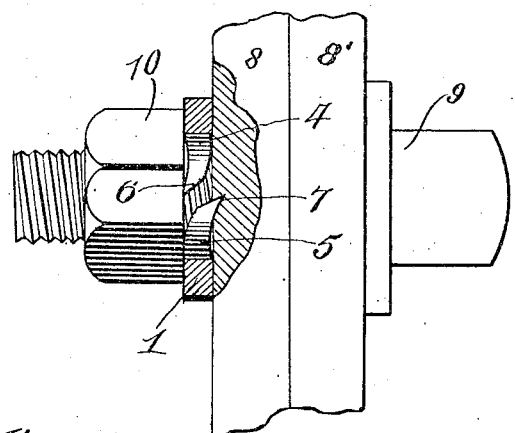
Figure 2:
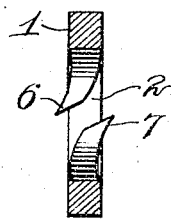
Figure 3:
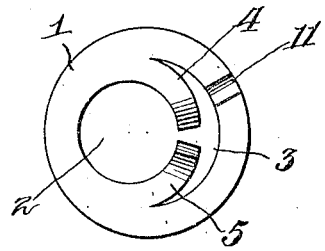

Figure 1 is a sectional side elevation showing the application of the invention. Fig. 2 is a transverse section through the locking washer. Fig. 3 is a face view of the same.

Referring to the drawing, my improved nut lock device comprises a washer 1 of circular or other approved form and having an eccentrically arranged bolt-hole 2. Between the innermost portion of the periphery of this bolt-hole and the adjacent portion of the periphery of the washer, the latter is provided with a segmental or crescent-shaped slot 3 extending concentric or substantially so with the axis of the hole and partially separating a portion of the body of the washer which is slitted to provide a pair of oppositely arranged tongues 4 and 5, the free end of the tongue 4 being pointed and projected beyond the front face of the washer, as shown at 6, while the free end of the tongue 5 is bent in the reverse direction beyond the rear face of the washer, as shown at 7.

Fig. 1 shows the mode of use of the device, 8 and 8' designating objects to be secured or clamped together, 9 the clamping bolt passing therethrough, and 10 the clamping nut fitted upon the threaded end of the bolt. After the bolt has been applied, the washer is fitted upon the threaded end thereof until the point of the tongue 7 contacts with the surface of the adjacent object such as 8, after which the nut 10 is applied and screwed up until it comes in contact with the front face of the washer. The pressure of the nut against the washer forces the point 6 of the tongue 4 inward to allow the nut to bear squarely against the face of the washer, and also forces the point 7 of the tongue 5 into or against the surface of the object 8, and when the nut is fully screwed home the parts will be firmly and securely clamped in position and the resilient tongue arranged to bear against the nut and object against which the washer bears to prevent retrograde rotation of the nut and washer. The face of the washer may be provided with a groove 11 for the insertion of a pin or the like between the face of the washer and the bearing surface of the nut, so that the tongue 4 may be pressed back to permit the nut to be turned off the bolt when occasion requires.

It will be seen from the foregoing description that my invention provides a nut locking washer which is simple of construction, efficient in operation in locking the nut against casual retrograde movement, and adapted to permit removal of the nut by manual operation when a necessity for its removal exists.

Having thus fully described the invention, what is claimed as new is:

A nut lock comprising a spring metal washer having an eccentrically arranged bolt-hole, and provided between the inner side of said hole and the adjacent portion of the periphery of the washer with a crescent-shaped slot, forming an intervening partially separated portion divided to provide a pair of locking tongues having pointed ends extending circumferentially of the washer in opposite directions, one of said tongues having its pointed end projecting beyond the front face of the washer and the other tongue having its pointed end projecting beyond the rear face of the washer, the said portion of the periphery opposite the slot being intact throughout and having its outer face provided with a recess in line with one of the tongues.

In testimony whereof I affix my signature in presence of two witnesses.

WILLIAM E. HALL.

Witnesses:
   JOHN BRICKER,
   J. M. SCHREIBER.